United States Patent [19]

Dynie et al.

[11] 4,406,645
[45] Sep. 27, 1983

[54] SPROCKET-BRAKE DRUM CONSTRUCTION FOR CHAIN SAW

[75] Inventors: Ernest R. Dynie; Colin Overy; Ronald J. Lipscombe, all of Brockville, Canada

[73] Assignee: Black & Decker Inc., Newark, Del.

[21] Appl. No.: 201,412

[22] PCT Filed: Aug. 8, 1980

[86] PCT No.: PCT/US80/01011
§ 371 Date: Oct. 30, 1980
§ 102(e) Date: Oct. 30, 1980

[87] PCT Pub. No.: WO82/00436
PCT Pub. Date: Feb. 18, 1982

[51] Int. Cl.³ .................. F16H 55/30; F16H 55/42
[52] U.S. Cl. .................................... 474/158; 474/171
[58] Field of Search ............... 474/158, 171; 403/359, 403/364; 30/382, 383, 384, 385, 386; 188/77 R; 192/56 R

[56] References Cited

U.S. PATENT DOCUMENTS

| | | | |
|---|---|---|---|
| 1,276,579 | 8/1918 | Scott | 30/382 |
| 2,857,750 | 10/1958 | Fox | 64/30 |
| 3,045,502 | 7/1962 | Carlton | 74/243 |
| 3,144,782 | 8/1964 | Edmunson | 74/243 |
| 3,144,890 | 1/1964 | Irgens | 143/32 |
| 3,337,940 | 8/1967 | Stihl et al. | 29/159 |
| 3,491,806 | 1/1970 | Kaisser et al. | 143/32 |
| 3,519,037 | 7/1970 | Linkfield | 143/32 |
| 3,786,687 | 1/1974 | Gasner | 74/243 |
| 3,868,863 | 3/1975 | Gasner | 74/243 |
| 3,962,929 | 6/1976 | Silvon | 474/158 |
| 3,991,469 | 11/1976 | Frederickson | 30/381 |
| 4,091,896 | 5/1978 | Wieland | 188/166 |
| 4,121,339 | 10/1978 | Nikolich | 30/381 |
| 4,156,477 | 5/1979 | Nagashima | 188/77 |
| 4,353,705 | 10/1982 | Scott et al. | 474/158 |

OTHER PUBLICATIONS

*Mechanisms, Linkages, and Mechanical Controls*, Nicholas P. Chironis (ed.), 1965, McGraw Hill.

Primary Examiner—Lawrence J. Staab
Assistant Examiner—Michael D. Bednarek
Attorney, Agent, or Firm—R. B. Sherer; Harold Weinstein; Charles E. Yocum

[57] ABSTRACT

A drive assembly for a chain saw (10) having a brake (42) wherein lugs (102) formed integrally on the brake drum (78) are mechanically connected within opening (72) of adjacent pairs of teeth (70) on the sprocket (22) which drives the saw chain (18) so that upon application of the brake (42) the brake drum (78) and the sprocket (22) stop simultaneously. The drive assembly includes a clutch (94) and a fastener (26) threadedly received on the drive shaft (24) to complete the assembly.

8 Claims, 7 Drawing Figures

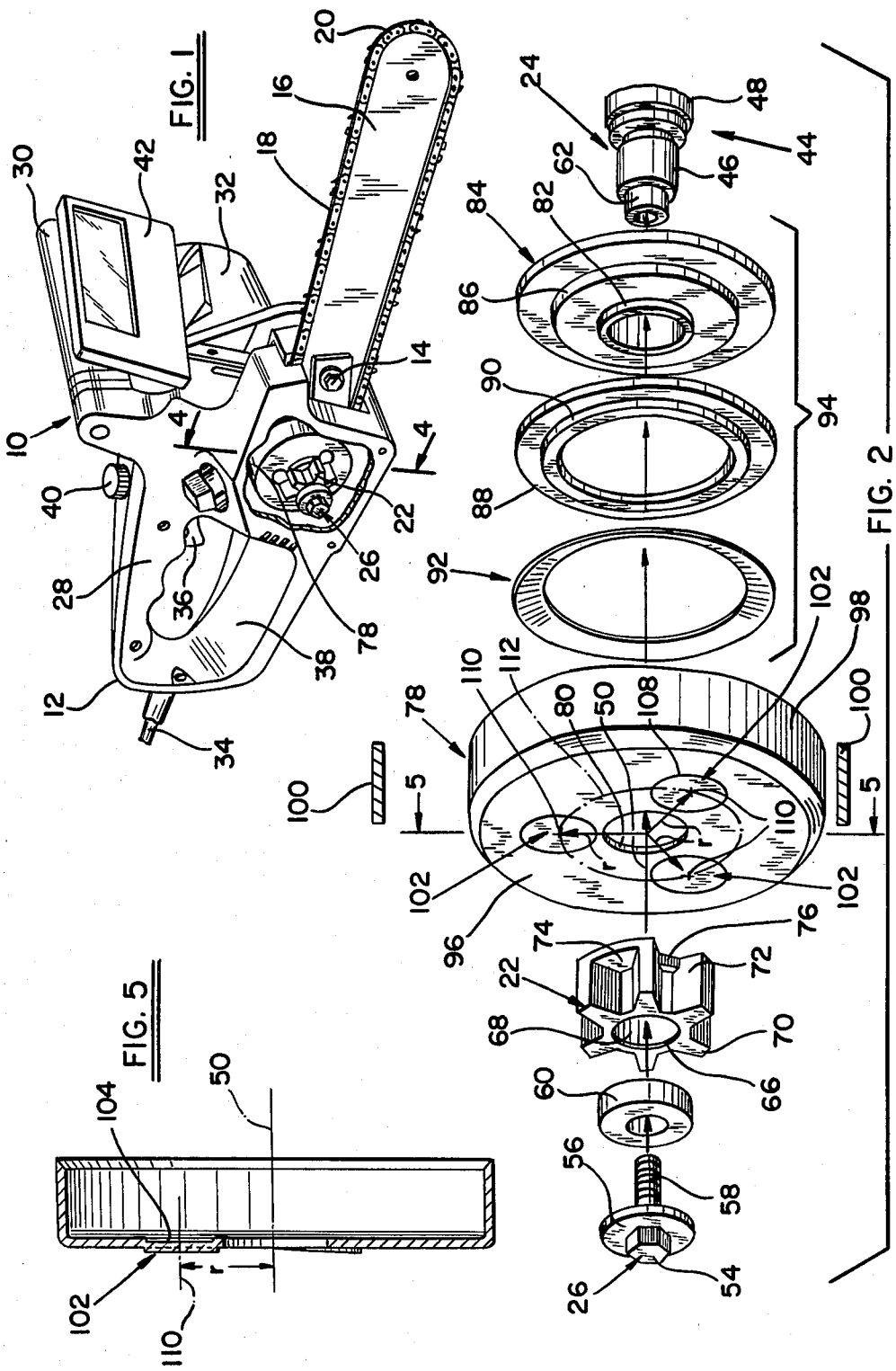

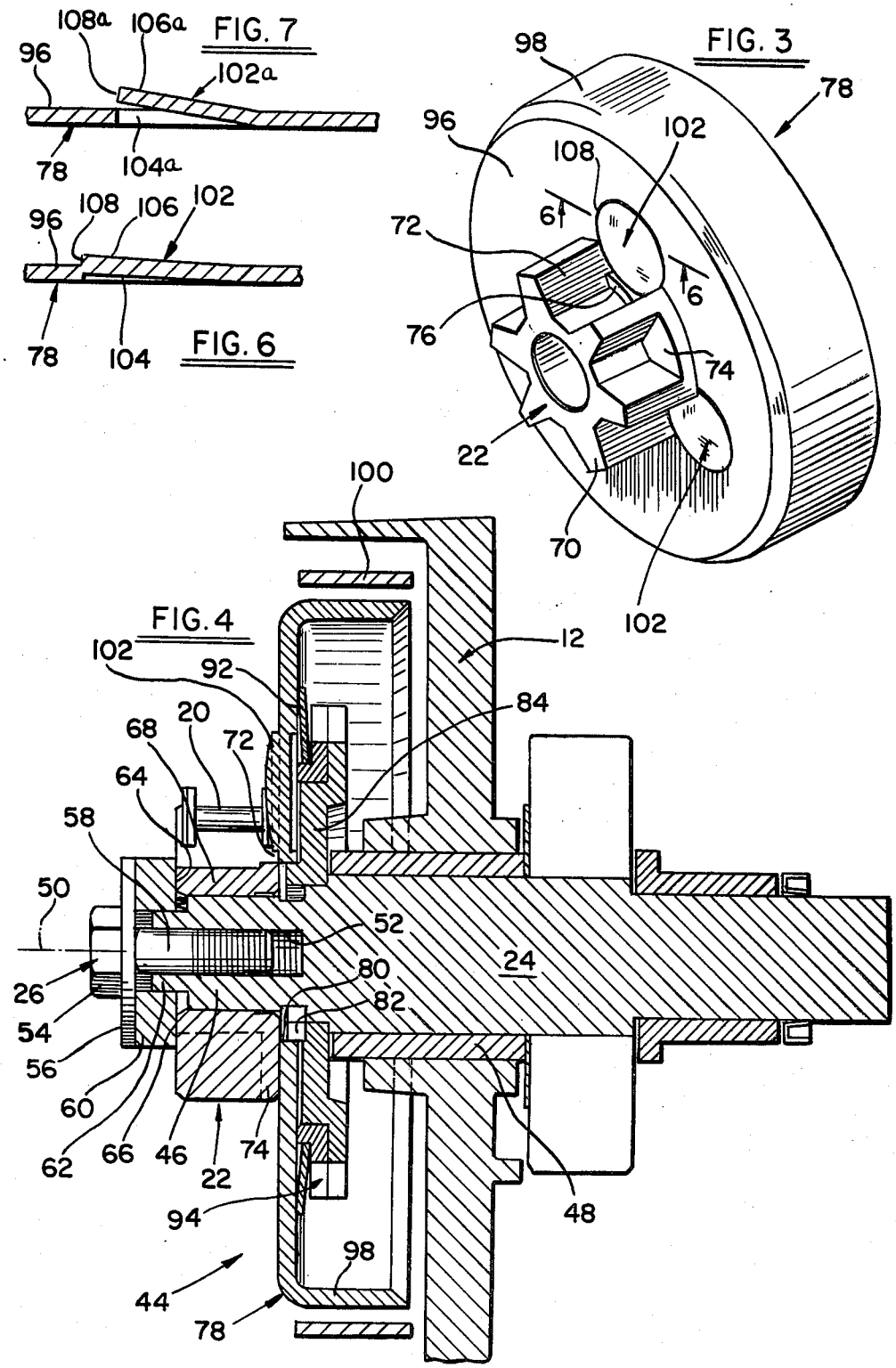

SPROCKET-BRAKE DRUM CONSTRUCTION FOR CHAIN SAW

BACKGROUND OF THE INVENTION

Heretofore the brake drum and sprocket were affixed to each other as by brazing or tab in slot connections so as to form a combined subassembly of the drive assembly or coupling. However, this was expensive and added complexity and steps to the assembly of the drive system of the chain saw. Also, since a high degree of skill was involved in producing the subassembly it might result in a higher than average rate of rejected parts.

SUMMARY OF THE INVENTION

It is an object of the present invention to provide an improved sprocket-brake drum construction for chain saw which overcomes the disadvantages of the prior art; which is economical, reliable and simple; which detachably connects the brake drum and the sprocket to the drive shaft; which mechanically connects the brake drum and the sprocket; which has lugs integrally formed on the brake drum; which lugs fit into openings between adjacent pairs of teeth of the sprocket; which lugs have a locking edge; which lugs are formed equidistant from each other along a circumferential line; which lugs will wear into uniform teeth engagement; which has a drive coupling with a clutch; which lugs are punched; and which lugs are semi-punched.

Other objects and advantages will be apparent from the following description of the invention, and the novel features will be particularly pointed out hereinafter in the claims.

BRIEF DESCRIPTION OF THE DRAWINGS

This invention is illustrated in the accompanying drawings in which:

FIG. 1 is a perspective view, partially cutaway, of a chain saw showing the novel sprocket-brake drum assembly of the present invention, without showing the brake band on the brake drum and only a dotted line representation of the saw chain on the sprocket.

FIG. 2 is an exploded, enlarged perspective view of the sprocket-brake drum assembly of FIG. 1.

FIG. 3 is a perspective view of the connection of the sprocket-brake drum taken alone showing the lugs engaged in alternate openings between adjacent teeth.

FIG. 4 is an elevational view, partly in section taken along line 4—4 of FIG. 1 showing the sprocket-brake drum assembly of the present invention.

FIG. 5 is an elevational view, partly in section taken along line 5—5 of FIG. 2, showing the lugs of the brake drum.

FIG. 6 is an enlarged sectional view taken along line 6—6 of FIG. 3 showing the semi-punched holes which produce the lugs of the brake drum.

FIG. 7 is an enlarged sectional view of another embodiment of the lugs, showing the lugs of the brake drum punched through therein.

DESCRIPTION OF THE INVENTION

A portable hand-held chain saw designated generally 10 is shown in FIG. 1 and embodies the present invention. The chain saw 10 has a housing 12 to which is affixed by a fastener 14 a guide or saw bar 16 which extends forwardly therefrom. An endless saw chain 18 is entrained on the saw bar and the links 20 thereof are driven by a sprocket 22 detachably mounted to a drive shaft or spindle 24 by a screw or bolt fastener 26 as illustrated in FIGS. 2 and 4.

The housing 12 has a rear handle 28 and a transversely disposed forward handle 30 in superposition to a motive means as, for example, an electric motor (not shown) housed in a motor casing 32 to drive the drive shaft through a gear train (not shown). The motor is connected to a source of electricity by a cord 34 and actuated by a trigger switch 36 which is depressed to turn the motor on. The handle 28 has an enclosed and widened lower portion 38 which serves to cover the operator's hand from contact from beneath. An oiler system, manual or automatic, may be used with the chain saw 10 with the oil cap 40 thereof being disposed on top of the handle 28 immediately behind the handle 30.

Forwardly of the handle 30 is a brake lever 42 shown in FIG. 1 in the nonoperative position, which when pivoted clockwise toward the saw bar 16 will be in the braking position as discussed hereinafter.

The drive assembly or coupling 44 has sleeve bearings 46 and 48 mounted on the drive shaft 24 with the sprocket 22, made of an oil impregnated material, journaled on bearing 46 and the shaft 24 journaled to the housing 12 via bearing 48, as illustrated in FIGS. 2 and 4. The drive shaft has an axis 50 and has a threaded bore 52 at its outward end which receives the fastener 26 therein. The fastener 26 has a hexagonal head 54 and an integral washer 56 inboard thereof with a conventional threaded shank 58. A thrust washer 60 is disposed on the reduced diameter end 62 of the shaft 24, and has a clutch surface 64 on the inner end thereof which engages the outboard edge 66 of the hub 68 of the sprocket 22. Six circumferentially spaced teeth 70 extend radially outwardly from the hub 68 which are drivingly engaged with the links 20 of the saw chain 18 to drive the same. The teeth 70 are spaced apart and form alternate openings 72 and webs 74 at the inboard end of the sprocket 22 as illustrated in FIGS. 2, 3 and 4. A rib 76 is formed above the hub 68 below the opening 72. The openings 72 are "V" shaped above the ribs 76.

A brake drum 78 shown in FIGS. 2, 3 and 4 is disposed inwardly of the sprocket 22 and has a central aperture 80 which rests on an annular flange 82 of a clamp plate 84 keyed to the shaft 24 between the bearings 46 and 48. The clamp plate 84 has an upper annular recess 86 upon which is nested a bronze oil impregnated thrust washer 88 which has a like facing upper annular recess 90 into which is keyed a spring washer 92 of the belleville type, all of which along with the thrust washer 60 define a clutch assembly 94. The upper end of the spring washer 92 bears against the inner surface of a plate 96 of the brake drum 78, which clutch assembly 94 and sprocket 22 and brake drum 78 will be tightened to each other to the proper torque upon connection of the fastener 26 in assembling the drive coupling 44.

The brake drum 78 illustrated in FIGS. 2 through 5 has a brake flange 98 turned to extend axially inwardly from the plate 96, with a brake band 100 of the brake means disposed in superposition thereto, and shown best in the open, non-braking position in FIG. 4, which corresponds to its position when the brake lever is in the position shown in FIG. 1. However, it is understood that upon applying the brake that the band 100 will close upon the flange 98 and stop almost instantaneously the brake drum 78. In the preferred embodiment of the invention three semi-punched protrusions or lugs 102 are formed on the plate 96 of the brake drum 78 such that there is a hole 104 on the inboard side thereof and a raised surface 106 which slopes counter to the normal direction of rotation (clockwise) so as to form a locking edge 108. FIG. 6 shows the semi-punched lug 102, while FIG. 7 shows another embodiment of the plate 96 showing a lug 102a which is punched through the plate 96 to form a hole 104a to produce the raised sloped protrusion 106a which terminates in the locking edge 108a which will function in the same manner as that of the edge 108 so that only edge 108 need be described hereinafter, but it is understood that either one of the lugs 102 or 102a could be formed on the plate 96 of the brake drum 78.

The drive coupling or assembly 44 will be assembled with the above-described components mounted to the drive shaft 24 and properly torqued upon the tightening of the fastener 26 to the shaft 24 to complete the assembly. The sprocket 22 and the brake drum 78 as illustrated in FIGS. 1, 3, and 4 will be mechanically connected to each other in that the lugs 102 are engaged in the openings 72 to bear against one or both adjacent teeth 70, so that the brake drum 78 and the sprocket 22 act as a single unit for purposes of either rotation when the motor rotates the drive shaft 24, or for purposes of stopping when the brake is applied via the closing of the brake band 100 upon the flange 98 of the brake drum 78, with the clutch 94 permitting the shaft to continue to rotate though the brake drum 78 and mechanically connected sprocket 22 have substantially simultaneously stopped which causes the saw chain 18 being driven by the sprocket 22 also to cease rotation.

The brake is applied via the brake lever 42 because of any reason such as "kick-back" or the like. This closes the brake band 100 upon the flange 98 to stop the brake drum 78 abruptly. The brake drum had been rotating clockwise as viewed in FIG. 2 with the locking edge 102 formed at the trailing edge of rotation. When the brake drum 78 is abruptly stopped, the sprocket wants to continue to rotate clockwise as viewed in FIG. 2 but the locking edge 108 is engaged in the opening 72 to abut one of the teeth 70 and this clamping action forces the sprocket 22 to almost simultaneously also come to an abrupt stop, along with the brake drum, due to the mechanical connection between the lugs 102 and the teeth 70 at the leading edge thereof.

Of course, the torque of the clutch 94 is set high enough to prevent "false" shutdowns or slippage of the drive coupling 44.

The lugs 102 shown best in FIGS. 2 and 5 are substantially circular with the center 110 of each lying a distance "r" from the axis 50 of shaft 24, and each of the centers 110 are formed on a hypothetical circumferential axis 112 which passes therethrough. The lugs 102 are spaced radially outwardly of the aperture 80; and, as shown in FIG. 4, the spring washer 92 bears against the inner surface of the plate 96 radially above the top of the lugs 102.

The brake drum 78 is made of hardened metal relative to the oil impregnated sprocket 22 so that any manufacturing tolerances which might result in less than all of the locking edges abutting the teeth 70 at the leading edges thereof will be readily adjusted by wear at the teeth 70 which are so engaged. This wear will continue until there is a uniform abutment or locking engagement between the respective locking edges 108 and teeth 70, even if such abutment started out between only one lug 102 and one of the teeth 70. The design provides for the mechanical connection between the brake drum 78 and sprocket 22 to produce simultaneous abrupt stoppage of both members, even though only one lug 102 abuts only one of the teeth 70.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention what is claimed herein is:

1. A drive assembly for a chain saw having a housing with a handle, a saw bar extending forwardly of the housing and carrying a saw chain thereon, motive means mounted in the housing and coupled to the drive assembly including a drive shaft having an axis and normally to drive the saw chain, a braking means including a brake band positionable between an open non-braking position and a closed braking position, the drive assembly comprising:
   (a) a brake drum disposed on the drive shaft having a plate extending outwardly from the drive shaft to turn axially into a flange engageable by the brake band,
   (b) a plurality of substantially circular lugs formed integrally on the plate of the brake drum and spaced equidistantly from each other about the drive shaft a predetermined distance from the axis of the drive shaft,
   (c) a sprocket on the drive shaft adjacent the plate and having a plurality of sprocket teeth in driving engagement with the saw chain,
   (d) the sprocket defining openings between adjacent pairs of sprocket teeth,
   (e) the lugs extending axially outwardly from the plate and within the sprocket openings,
   (f) each substantially circular lug sloping at an acute angle from the surface of the plate outwardly, in a direction opposite to the direction of normal sprocket rotation for cutting, to form a locking edge abutting at least one of the sprocket teeth within each of the openings,
   (g) the brake drum being formed of harder material relative to the sprocket whereby normal wear of the sprocket teeth will permit uniform engagement to occur between adjacent teeth and locking edges,
   (h) clutch means operatively associated with the drive assembly and the braking means to permit the drive shaft to continue to rotate with the braking means in the braking position, and
   (i) fastening means connecting the drive assembly to prevent disassembly of the brake drum and sprocket therefrom.

2. A drive coupling for a chain saw in which a motive means is mounted in the housing having a saw chain rotatively mounted on a saw bar extending forwardly from the housing and drive through the drive coupling by the motive means, a brake means including a brake band operative between an open non-braking position and a closed braking position, a clutch operatively associated with the drive coupling to permit braking of the drive coupling during operation of the motive means, the drive coupling including the clutch comprising:
   (a) a drive shaft, (b) a brake drum detachably connected to the drive shaft, and adapted to be stopped from rotation by the brake means, (c) a sprocket detachably connected to the drive shaft and mechanically connected to the brake drum, (d) a plurality of lugs formed on the brake drum along a predetermined circumferential line, (e) a plurality of teeth formed on the sprocket, (f) openings formed between at least some of the teeth to permit the lugs to be engaged between the teeth of the opening, (g) the clutch including a plate clamp, thrust washer and spring washer on the side of the brake drum remote from the sprocket and a thrust washer on the side of the sprocket remote from the brake drum, (h) fastening means connected to the drive shaft with a predetermined torque to assemble the sprocket and brake drum intermediate the clutch, (i) a hub formed on the sprocket, (j) the thrust washer adjacent the sprocket engaging the hub thereof, (k) the plate clamp keyed to the drive shaft and having a raised annular recess facing the brake drum, (l) the thrust washer adjacent the brake drum nesting in the recess of the plate clamp, and having an axial flange thereon, and (m) the spring washer affixed to the thrust washer at one edge of said washer and abutting the adjacent surface of the brake drum at the outer edge of said washer to spring load the thrust washer against the plate clamp whereby the clutch permits the brake drum and sprocket to stop relative to the drive shaft upon braking of the brake drum.

3. The combination claimed in claim 2 wherein:

(a) the lugs are each formed with a substantial equal midpoint radius measured from the axis of the drive shaft, (b) the recess of the plate clamp formed substantially at the midpoint of the lugs, (c) the flange of the thrust washer is formed on the inner end thereof whereby the spring washer slopes upwardly therefrom toward the brake drum, and (d) the spring washer engages the brake drum above the lugs.

4. The combination claimed in claim 2 wherein:

(a) the lugs are formed by punching the plate of the brake drum whereby a protrusion extends axially from the plate in the direction of the sprocket.

5. The combination claimed in claim 4 wherein:

(a) the lugs have a circular shape and are equidistantly spaced from each other.

6. The combination claimed in claim 4 wherein:

(a) the lugs have a raised surface that slopes in the direction opposite to that of normal sprocket rotation for cutting to define a locking edge engaging one of the pairs of teeth to clamp the sprocket to the brake drum whereby braking of the drum simultaneously stops the rotation of the sprocket.

7. The combination claimed in claim 6 wherein:

(a) the lugs are punched through the plate at the raised edge thereof.

8. The combination claimed in claim 2 wherein:

(a) the teeth of the sprocket are formed in an even number, (b) a web extends between alternate pairs of teeth, and (c) the openings between alternate pairs of teeth are of like number as and correspond in size to the respective number and size of the lugs.

* * * * *